United States Patent
Irmler et al.

(10) Patent No.: US 10,240,488 B2
(45) Date of Patent: Mar. 26, 2019

(54) EXHAUST GAS SYSTEM FOR A MOTOR VEHICLE

(71) Applicant: Mahle Behr GmbH & Co. KG, Stuttgart (DE)

(72) Inventors: Klaus Irmler, Tuebingen (DE); Michael Schmidt, Bietigheim-Bissingen (DE); Peter Geskes, Ostfildern (DE); Eberhard Pantow, Winnenden (DE); Andreas Kleber, Marbach (DE)

(73) Assignee: Mahle Behr GmbH & Co. KG (DE)

( * ) Notice: Subject to any disclaimer, the term of this patent is extended or adjusted under 35 U.S.C. 154(b) by 98 days.

(21) Appl. No.: 15/307,810

(22) PCT Filed: Apr. 30, 2015

(86) PCT No.: PCT/EP2015/059522
§ 371 (c)(1),
(2) Date: Oct. 28, 2016

(87) PCT Pub. No.: WO2015/166055
PCT Pub. Date: Nov. 5, 2015

(65) Prior Publication Data
US 2017/0067372 A1    Mar. 9, 2017

(30) Foreign Application Priority Data

Apr. 30, 2014  (DE) .................. 10 2014 208 253

(51) Int. Cl.
*F01N 13/08* (2010.01)
*F01K 23/10* (2006.01)
(Continued)

(52) U.S. Cl.
CPC ............ *F01K 23/101* (2013.01); *B60K 13/04* (2013.01); *F01K 15/02* (2013.01); *F01K 23/065* (2013.01);
(Continued)

(58) Field of Classification Search
CPC .. F01N 3/0205; F01N 3/2889; F01N 13/1805; F01N 13/1822; F01N 2240/02; F01N 2410/02
See application file for complete search history.

(56) References Cited

U.S. PATENT DOCUMENTS

| 4,506,505 A | 3/1985 | Melzer |
| 6,178,744 B1 | 1/2001 | Perset |

(Continued)

FOREIGN PATENT DOCUMENTS

| DE | 3509016 A1 | 9/1985 |
| DE | 19817341 A1 | 11/1998 |

(Continued)

OTHER PUBLICATIONS

English abstract for DE-3509016.
(Continued)

*Primary Examiner* — Jonathan Matthias
(74) *Attorney, Agent, or Firm* — Fishman Stewart PLLC

(57) ABSTRACT

An exhaust gas system for a motor vehicle may include an exhaust gas aftertreatment device communicating fluidically with an exhaust gas evaporation device. The exhaust gas aftertreatment device and the exhaust gas evaporation device may be arranged in one or more housings. A connecting line may be provided to fluidically connect the exhaust gas aftertreatment device to the exhaust gas evaporation device. The connecting line may include a fluid inlet connected to the exhaust gas aftertreatment device and a fluid outlet connected to the exhaust gas evaporation device. An evaporation bypass line may branch off from the connection line at a branching-off point. A valve apparatus may be arranged in at least the connecting line and may be adjustable between a first position to fluidly connect the fluid inlet to the fluid (Continued)

outlet, and a second position to fluidly connect the fluid inlet to the evaporator bypass line.

14 Claims, 3 Drawing Sheets

(51) Int. Cl.
    *B60K 13/04* (2006.01)
    *F01N 5/02* (2006.01)
    *F01N 13/18* (2010.01)
    *F01K 23/06* (2006.01)
    *F02G 5/02* (2006.01)
    *F01N 3/00* (2006.01)
    *F01K 15/02* (2006.01)

(52) U.S. Cl.
    CPC .................. *F01N 3/00* (2013.01); *F01N 5/02* (2013.01); *F01N 13/1805* (2013.01); *F01N 13/1844* (2013.01); *F02G 5/02* (2013.01); *B60Y 2200/14* (2013.01); *F01N 2240/02* (2013.01); *F01N 2410/00* (2013.01); *F01N 2410/02* (2013.01); *F01N 2590/08* (2013.01); *Y02T 10/16* (2013.01); *Y02T 10/20* (2013.01)

(56) References Cited

U.S. PATENT DOCUMENTS

| | | | |
|---|---|---|---|
| 6,330,910 B1 * | 12/2001 | Bennett | F01N 3/02 165/103 |
| 6,718,956 B2 * | 4/2004 | Klipfel | F28D 7/1669 123/568.12 |
| 7,536,853 B2 | 5/2009 | Cook et al. | |
| 2008/0185133 A1 * | 8/2008 | Mabuchi | B60K 13/04 165/168 |
| 2009/0038302 A1 * | 2/2009 | Yamada | F01N 3/0205 60/320 |
| 2009/0255243 A1 | 10/2009 | Raab et al. | |
| 2011/0099989 A1 | 5/2011 | Prior et al. | |
| 2012/0036850 A1 * | 2/2012 | Ernst | F01K 23/065 60/615 |
| 2012/0260635 A1 | 10/2012 | Aneja et al. | |

FOREIGN PATENT DOCUMENTS

| | | |
|---|---|---|
| DE | 19857509 A1 | 7/1999 |
| DE | 102004048335 A1 | 4/2006 |
| DE | 102009048799 A1 | 4/2011 |
| EP | 0079033 A1 | 5/1983 |
| EP | 1870572 A2 | 12/2007 |
| EP | 2110527 A2 | 10/2009 |
| GB | 1385331 A | 2/1975 |
| WO | WO-2007125418 A2 | 11/2007 |
| WO | WO-2012168541 A1 | 12/2012 |
| WO | WO-2012169375 A1 | 12/2012 |

OTHER PUBLICATIONS

English abstract for DE-102009048799.
English abstract for DE-102004048335.
English abstract for DE-19817341.

\* cited by examiner

EXHAUST GAS SYSTEM FOR A MOTOR VEHICLE

CROSS-REFERENCE TO RELATED APPLICATIONS

This application claims priority to German Patent Application No. 10 2014 208 253.6, filed Apr. 30, 2014, and International Patent Application No. PCT/EP2015/059522, filed Apr. 30, 2015, both of which are hereby incorporated by reference in their entirety.

TECHNICAL FIELD

The invention relates to an exhaust gas system for a motor vehicle, in particular for a commercial vehicle. Furthermore, the invention relates to a motor vehicle, in particular a commercial vehicle, having an exhaust gas system of this type.

BACKGROUND

Modern internal combustion engines use heat recuperation from the exhaust gas which is produced during the combustion operation in order to increase efficiency. What are known as exhaust gas evaporators are based on this operative principle, which exhaust gas evaporators, as part of an exhaust gas system which interacts with the internal combustion engine, are flowed through both by exhaust gas and a liquid operating medium. Here, the hot exhaust gas evaporates the liquid operating medium which is present in gas form after the evaporation and can be expanded during the course of a Rankine process, as a result of which mechanical work is produced. Said mechanical work can be coupled into the drive train of the internal combustion engine in order to increase efficiency.

Conventional exhaust gas evaporators are typically equipped with a housing of sufficient dimensions, and are mounted on the vehicle frame together with further components which act in the exhaust gas section of the internal combustion engine. A further component of this type is often an exhaust gas aftertreatment device which is connected upstream of the exhaust gas evaporator. It serves to treat and purify the pollutants which are present in the exhaust gas before they are introduced into the exhaust gas evaporator and are subsequently released by the latter into the surroundings of the motor vehicle. Said exhaust gas aftertreatment device is also usually equipped with a separate housing and is fastened to the vehicle body by means of suitable fastening means in an analogous manner to the exhaust gas evaporator. The necessary fluidic connection between the exhaust gas aftertreatment device takes place as a rule via a suitably configured exhaust gas pipe which is arranged between the exhaust gas aftertreatment device and the exhaust gas evaporator.

It proves a problem in exhaust gas systems of this type that the components which are typically configured separately and are equipped in each case with an individual housing are associated with a considerable requirement for installation space. Said installation space is usually available only to a limited extent in modern motor vehicles, however. In addition, what is known as an exhaust gas bypass line is as a rule necessary, in order to make bypassing of the exhaust gas which exits from the exhaust gas aftertreatment device past the exhaust gas evaporator directly into the surroundings possible when required, and therefore to avoid an input of heat into the Rankine circuit. This can become necessary, for example, for safety reasons in the case of an emergency switch-off of the system. The arrangement of a bypass line of this type also requires additional installation space, in particular in conjunction with a valve device for closing the bypass line.

Against said background, EP 2 110 527 B1 discloses a commercial vehicle having an internal combustion engine and a heat recovery system which interacts with the latter. A medium circuit of said heat recovery system is arranged in a silencer which in turn is arranged in an exhaust gas section of the internal combustion engine of the motor vehicle.

SUMMARY

It is an object of the present invention to provide an improved embodiment of an exhaust gas system having an exhaust gas aftertreatment device and an exhaust gas evaporation device, which embodiment is distinguished by a reduced installation space requirement, without restrictions in the functionality of the exhaust gas system being associated.

Said object is achieved by way of the subject matter of the independent patent claim(s). Preferred embodiments are the subject matter of the dependent patent claims.

Accordingly it is a core concept of the invention to equip the exhaust gas treatment device and the exhaust gas evaporation device either with separate housings and to arrange the latter directly adjacently with respect to one another and to fasten them to one another, with the result that they form one structural unit, or, as an alternative, to dimension the housing of the exhaust gas aftertreatment device in such a way that it accommodates not only the essential components of the exhaust gas aftertreatment device, but rather is also capable of receiving those of the exhaust gas evaporation device. In the first case, said bypass line is arranged at least partially between the two housings, and in the latter case it is arranged within the housing of the exhaust gas aftertreatment device. Both variants permit the arrangement of the exhaust gas aftertreatment unit and the exhaust gas evaporation device as one structural unit which can be mounted as a unit on the motor vehicle. This leads to a reduced installation space requirement. Moreover, the assembly complexity is also simplified. The fastening to the motor vehicle can take place via suitable fastening elements which realize, for example, a screw connection. As an alternative, mounting by way of a cantilever arm which acts as a support and tensioning straps for fixing to a cantilever arm of this type are also conceivable.

An exhaust gas system according to the invention comprises an exhaust gas aftertreatment device and an exhaust gas evaporation device which is connected fluidically downstream of the exhaust gas aftertreatment device. Here, the exhaust gas aftertreatment device is arranged in a first housing which can be attached to the motor vehicle. Here, the term "exhaust gas aftertreatment device" includes all functional components of said device which serve for the aftertreatment and purification of the exhaust gas which is introduced into them. In the present case, a diesel soot particulate filter or an SCR catalytic converter are to be envisaged, for instance. Accordingly, all functional components of the exhaust gas evaporation device which was mentioned at the outset are to be understood under the term "exhaust gas evaporation device".

Furthermore, the exhaust gas system comprises a connecting line which connects the exhaust gas aftertreatment device fluidically to the exhaust gas evaporation device. Said connecting line has a fluid inlet which communicates fluidically with the exhaust gas aftertreatment device and a fluid outlet which communicates fluidically with the exhaust gas evaporation device. An evaporator bypass line branches off from the connecting line at a branching point, which evaporator bypass line in turn communicates fluidically with the surroundings of the exhaust gas system. According to the invention, the connecting line comprises a valve apparatus which can be adjusted between a first and a second position in such a way that the fluid inlet communicates fluidically with the fluid outlet in the first position and communicates fluidically with the bypass line in the second position.

In a first aspect of the invention, the exhaust gas evaporation device comprises a separate, second housing in addition to the first housing of the exhaust gas aftertreatment device. Here, the connecting line is arranged at least partially between the first and the second housing, and the two housings are fixed on one another by means of at least one fastening element. Therefore, the two housings which are fastened to one another together form a structural unit which for its part can be mounted as a whole on the motor vehicle, for instance on the body frame thereof. This can likewise take place with the aid of suitable fastening elements in the manner of a screw connection or a cantilever arm with tensioning straps which are provided on the first and/or on the second housing.

In a second aspect of the invention, in contrast, the exhaust gas evaporation device and the connecting line are arranged in a common housing. This means that the functional components both of the exhaust gas evaporation device and of the exhaust gas aftertreatment device are positioned in a single housing. This also applies to said connecting line. As a result, the exhaust gas aftertreatment device and the exhaust gas evaporation device also form a structural unit according to the second aspect of the invention, which structural unit can once again be fastened as one unit to the motor vehicle with the aid of the common housing.

In one preferred embodiment of the invention according to the first aspect, the branching point can be arranged between the housing of the exhaust gas aftertreatment device and the evaporation device housing. In this way, the installation space which is present between the two housings which are arranged adjacently with respect to one another can be utilized in an effective way.

In a further preferred embodiment, the connecting line and the evaporator bypass line are formed integrally on the second housing of the exhaust gas evaporation device. In other words, the provision of separate components for realizing the connecting line and the evaporator bypass line can be dispensed with in said variant. This results in reduced manufacturing costs during the production of the exhaust gas system.

The valve apparatus can particularly preferably have precisely one butterfly valve which is arranged at the branching point with two flap sections and a valve spindle which is arranged fixedly in terms of rotation between them. Said butterfly valve can be adjusted rotationally between the first and the second position. Said embodiment permits the realization of a controllable exhaust gas branch with a particularly low installation space requirement.

In one advantageous development, the two flap sections are configured in such a way that they form a line wall section of the connecting line in the first position of the valve apparatus. In contrast, they form a line wall section of the evaporator bypass line in the second position. A configuration of this type also requires a particularly small amount of installation space.

A common line wall section of curved configuration is particularly expediently formed integrally between the connecting line and the evaporator bypass line. Said line wall section delimits a transition region between the connecting line and the evaporator bypass line, in which transition region the second flap section can be moved between the first and the second position in order to adjust the valve apparatus.

According to a third aspect of the invention, the connecting line between the exhaust gas aftertreatment device and the exhaust gas evaporation device does not have a fluid branch for the evaporator bypass line, as is the case in the exhaust gas systems according to the first and second aspect. Instead, the evaporator bypass line is configured as a separate line which produces a direct connection between the exhaust gas aftertreatment device and the surroundings of the exhaust gas system. The connecting line and, moreover, also the evaporator bypass line also have a valve apparatus in the exhaust gas system according to the third aspect, which valve apparatus can be adjusted between a first and a second position. In the first position, the connecting line is released for being flowed through with exhaust gas, and the evaporator bypass line is closed in contrast. Conversely, the connecting line is closed and the evaporator bypass line is released for being flowed through with exhaust gas in the second position.

In the exhaust gas system according to the third aspect of the invention, the exhaust gas evaporation device and the connecting line are arranged in the housing of the exhaust gas aftertreatment device in the same way as in the exhaust gas system according to the second aspect. At least one fastening element is also provided on the housing of the exhaust gas aftertreatment device, by means of which fastening element said housing can be fastened to the motor vehicle. The fastening element can be part of a screw connection or can comprise a cantilever arm with tensioning straps.

In one advantageous construction of the exhaust gas system which requires a particularly small amount of installation space, a dividing wall is provided in the housing, which dividing wall divides the housing into a first and a second housing interior space. In this scenario, the first housing interior space accommodates the exhaust gas aftertreatment device, and the second housing interior space accommodates the exhaust gas evaporation device. A first aperture is provided in said dividing wall, which aperture is reached through by the connecting line, with the result that the fluid inlet is arranged in the first housing interior space and the fluid outlet is arranged in the second housing interior space. A second aperture is provided for the evaporator bypass line in the dividing wall.

The outlets of the connecting line and the evaporator bypass line are particularly expediently provided on the same housing wall of the housing of the exhaust gas aftertreatment device. An arrangement of this type of said outlets can be realized in one particularly preferred embodiment of the exhaust gas system according to the third aspect, by a third aperture being provided on a housing wall of the second housing interior space which lies opposite the dividing wall. The evaporator bypass line reaches through said third aperture. Furthermore, the evaporator bypass line extends in the second housing interior space in a manner which is separated fluidically from said second housing interior space, and reaches through the third aperture, with the result that the outlet of the evaporator bypass line can be arranged outside the housing.

In order for it to be possible to discharge the exhaust gas which flows through the evaporator bypass line to the outside into the surroundings of the exhaust gas system, it is proposed in a further preferred embodiment to provide an aperture in the above-described housing wall, through which aperture the evaporator bypass line is guided through the housing to the outside into the surroundings of the exhaust gas system.

Advantages in terms of manufacturing technology result in a further preferred embodiment of the invention according to the third aspect, in which embodiment a through opening is provided on the housing, through which through opening the exhaust gas evaporation device can be introduced into said housing. In a state in which it is inserted into the housing, the exhaust gas evaporation device including all functional components of the exhaust gas evaporation device is fixed on the housing via a fastening flange, in particular via a fastening plate, which is part of said exhaust gas evaporation device. At the same time, the fastening flange closes said through opening in a fluidtight manner.

In one preferred embodiment of the invention according to the first and second aspect, the valve apparatus can comprise a valve spindle which is mounted adjustably on the connecting line and a valve flap which is attached on the valve spindle. The mounting of the valve spindle on the connecting line takes place in such a way that the valve flap can be adjusted between a first and a second position by way of rotation of the spindle. Said valve flap closes the evaporator bypass line in a first position and releases the fluid outlet in said position. In the second position, in contrast, the evaporator bypass line is released and the fluid outlet is closed.

In a preferred embodiment which is alternative to this and can be used in the exhaust gas systems according to all three abovementioned aspects, the valve apparatus can be configured in the manner of a butterfly valve (known by this name to a relevant person skilled in the art). An essential feature of a butterfly valve of this type is a largely symmetrical arrangement of the valve flap relative to the rotatable valve spindle, in such a way that the spindle is arranged between a first flap section and a second flap section in a centered manner in the axial direction of the spindle with regard to a plan view of the butterfly valve. The valve apparatus which is presented here is equipped with two butterfly valves of this type which are both arranged within the connecting line in the exhaust gas system according to the first and second aspect. A first butterfly valve with two wing flaps and a first valve spindle which is arranged fixedly in terms of rotation between them is arranged between the branching point and the fluid outlet in the connecting line and releases the connecting line for being flowed through with exhaust gas in the first position, and in contrast closes said connecting line in the second position. In contrast, a second butterfly valve is arranged in the evaporator bypass line and serves to close the evaporator bypass line in the first position, whereas it releases said evaporator bypass line for being flowed through with exhaust gas in the second position.

In the exhaust gas system according to the third aspect, the first butterfly valve is arranged in the connecting line and the second butterfly valve is arranged in the evaporator bypass line.

In one advantageous development of the invention, the use of an electrically, hydraulically or pneumatically driven actuator is recommended for adjusting the valve spindle, whether this is the valve spindle of the flap valve or the valve spindle of the butterfly valves. Said actuator may be arranged at a suitable location in the housing of the exhaust gas aftertreatment device or between the two housings of the exhaust gas evaporation device and the exhaust gas aftertreatment device. The actuator serves to drive the valve apparatus, with the result that the latter can be adjusted between the first and the second position. The actuation of the actuator can preferably take place with the aid of a control unit which is likewise arranged in said housings. As an alternative, however, it is also conceivable that the actuation of the actuator takes place by way of the control unit of the internal combustion engine which interacts with the exhaust gas system.

In one particularly preferred embodiment, the valve device can also comprise a prestressing device which prestresses the valve flap or the butterfly valve into the second position. This permits the realization of a "failsafe function" for the exhaust gas evaporation device in such a way that, in the case of a failure of the actuator or its control unit, the fluid outlet is closed automatically. In this way, the components of the exhaust gas evaporation device can be protected in the case of a fault.

In order to ensure that, in a low load mode of the internal combustion engine which interacts with the exhaust gas system which is presented here, the exhaust gas which is produced by said internal combustion engine is fed as completely as possible to the exhaust gas evaporation device, a seal element, in particular in the manner of a seal ring, can be provided in the connecting line in one particularly preferred embodiment. Said seal element serves to seal the connecting line with respect to the surroundings of the exhaust gas system. The valve flap of the flap valve or the two flap sections of the butterfly valve can be supported on said seal ring in the second position.

Furthermore, the invention relates to a motor vehicle, in particular to a commercial vehicle, having an internal combustion engine and having an exhaust gas system which interacts with the internal combustion engine with one or more of the abovementioned features.

Further important features and advantages of the invention result from the subclaims, from the drawings and from the associated description of the figures using the drawings.

It goes without saying that the features which are mentioned above and which are still to be explained in the following text can be used not only in the respectively specified combination, but rather also in other combinations or on their own, without departing from the scope of the present invention.

Preferred exemplary embodiments of the invention are shown in the drawings and will be explained in greater detail in the following description, identical designations relating to identical or similar or functionally identical components.

DETAILED DESCRIPTION

Figure 1:
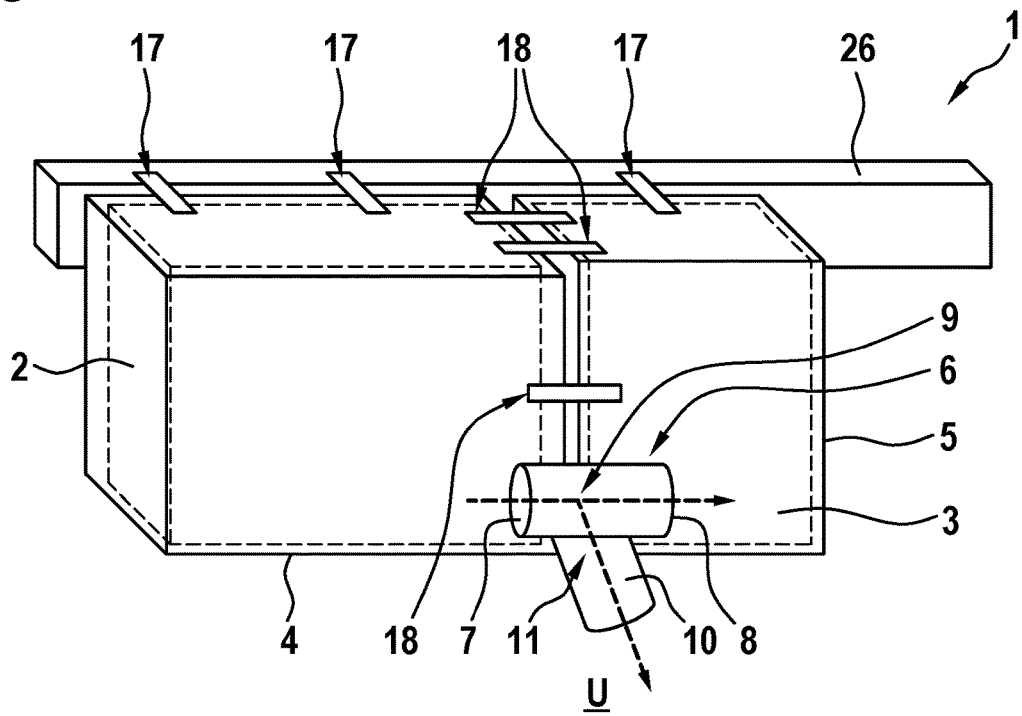
FIG. 1 shows one example of an exhaust gas system according to the invention in accordance with the first aspect in a perspective illustration.

FIG. 1 illustrates one example a first example of an exhaust gas system 1 according to the invention in a perspective illustration. Said figure clearly illustrates the modular construction of the exhaust gas system 1 having an exhaust gas aftertreatment device 2 and an exhaust gas evaporation device 3 which is connected downstream of the exhaust gas aftertreatment device 2 fluidically, which devices both have a respectively individual housing 4, 5. The functional components of the exhaust gas aftertreatment device 2 are received within the housing 4 of said exhaust gas aftertreatment device 2, and in contrast the functional components of the exhaust gas evaporation device 3 are received in the housing 5. Said components are not shown more precisely in the illustration of FIG. 1 for the sake of clarity.

As can be gathered from FIG. 1, the exhaust gas system 1 comprises a connecting line 6, by means of which the exhaust gas which is treated in the exhaust gas aftertreatment device 2 can be transported into the exhaust gas evaporation device 3. To this end, the connecting line 6 has a fluid inlet 7 which communicates fluidically with the exhaust gas aftertreatment device 2 and a fluid outlet 8 which communicates fluidically with the exhaust gas evaporation device 3. An evaporator bypass line 10 which communicates fluidically with the surroundings U of the exhaust gas system 1 branches from the connecting line 6 at a branching point 9. The exhaust gas which is introduced via said evaporator bypass line 10 out of the exhaust gas aftertreatment device 2 into the connecting line 6 can therefore be discharged directly into the surroundings U, without it being necessary for it to flow through the exhaust gas evaporation device 3 for this purpose. This can become necessary in certain operating states of an internal combustion engine which is connected upstream of the exhaust gas system 1, for instance if the exhaust gas which is injected by it reaches temperature values which, if the exhaust gas is introduced into the exhaust gas evaporation device 3, would lead to damage of individual, temperature-sensitive constituent parts.

In each case at least one fastening element 17 is provided on the two housings 4, 5, by means of which fastening element 17 said housing can be fastened to a frame part 26 of the motor vehicle. For additional stiffening of the arrangement, there is at least one further fastening element 18 according to the invention which fixes the two housings 4, 5 on one another, with the result that they form one structural unit. All fastening element 17, 18 which are shown in the figures can be part of a screw connection. As an alternative, mounting of the housings 4, 5 by way of a cantilever arm which acts as a support and tensioning straps for fixing to the cantilever arm is also conceivable.

Figure 4:
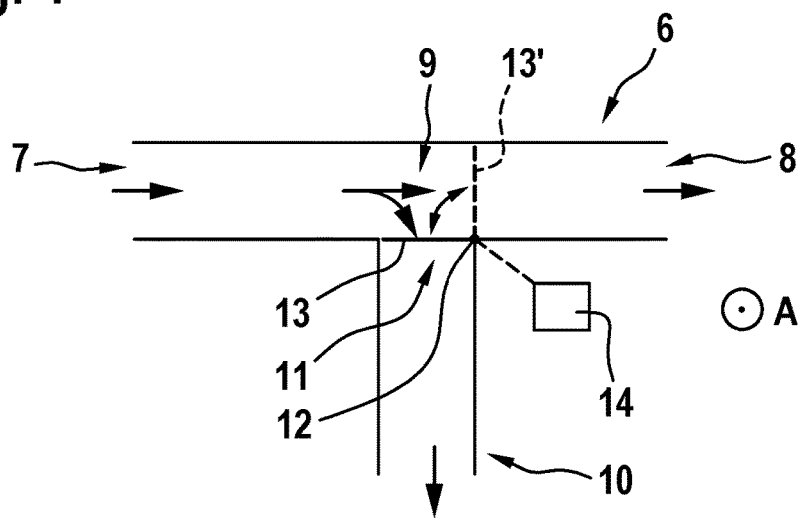
FIG. 4 shows an illustration in the manner of a circuit diagram which illustrates the valve apparatus of the exhaust gas system and in which the valve apparatus is configured as a pivotable valve flap.

Furthermore, a valve apparatus 11 which is provided in the connecting line 6 and is outlined merely in a roughly diagrammatic manner in FIG. 1 is essential to the invention in this context, the method of operation of which valve apparatus 11 becomes clear, however, using the illustration of FIG. 4 in the manner of a circuit diagram. It is first of all to be noted, however, that, as shown by FIG. 4, the branching point 9 is arranged between the housing 4 of the exhaust gas aftertreatment device 2 and the housing 5 of the exhaust gas evaporation device 3.

As shown in FIG. 4, the valve apparatus 1 can comprise a valve spindle 12 which is mounted adjustably on the connecting line 6 and a valve flap 13 which is attached fixedly on said valve spindle 12 so as to rotate with it. Here, the valve spindle 12 can be rotationally adjusted between a first position which is shown in FIG. 1, in which the valve flap 13 closes the evaporator bypass line 10 and at the same time releases the fluid outlet 8 in the first position, and a second position. In the second position (indicated by the dashed illustration of the valve flap 13'), the evaporator bypass line 10 is released for being flowed through with exhaust gas, whereas the fluid outlet 8 is closed by the valve flap 13'.

In order to adjust the valve apparatus 11 or the valve spindle 12 between the first and the second position, the exhaust gas system 1 can be equipped with an electrically, hydraulically or pneumatically driven actuator 14 which is outlined in FIG. 4 merely in a roughly diagrammatic manner. Moreover, it proves advantageous to provide the valve apparatus 11 with a prestressing device (not shown), by means of which the valve apparatus 11 is prestressed into the second position in the sense of a failsafe function.

Figure 5:
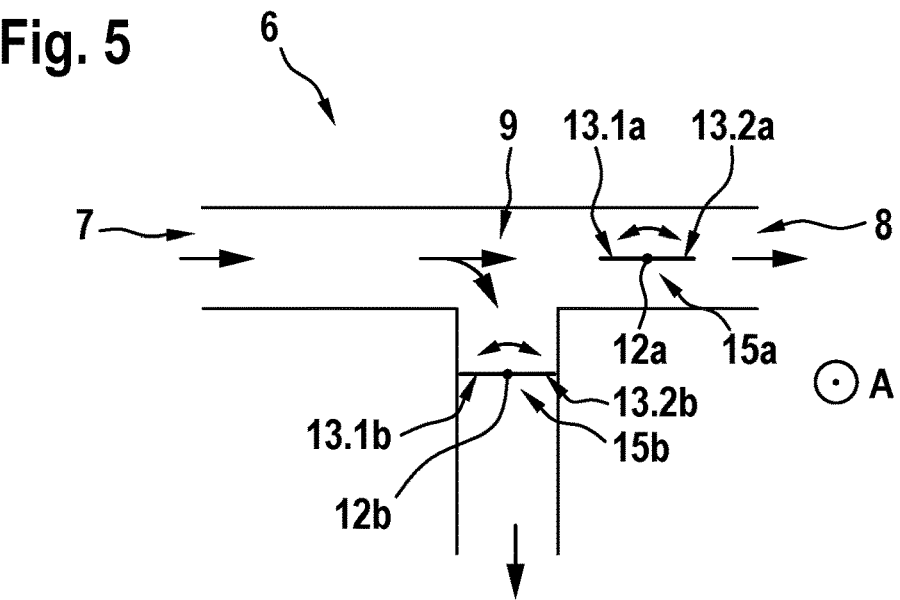
FIG. 5 shows one variant of the valve apparatus from FIG. 4, in which two butterfly valves replaced the pivotable valve flap.

FIG. 5 illustrates one variant of the valve apparatus 11, in which the flap valve of FIG. 4 is replaced by two butterfly valves 15a, 15b. In a butterfly valve 15a, 15b of this type, the respective valve spindle 12a, 12b is arranged in a centered manner with respect to a plan view of the butterfly valve 15a, 15b in the axial direction A of said spindle 12a, 12b between a first flap section 13.1a, 13.1b and a second flap section 13.2a, 13.2b, the two second flap sections 13.2a, 13.2b being configured in each case identically with respect to the associated first flap section 13.1a, 13.1b. The two butterfly valves 15a, 15b are arranged within the connecting line 6 if they are used in the exhaust gas system according to the first and second aspect of the invention. The first butterfly valve 15a is then situated in a position between the branching point 9 and the fluid outlet 8 within the connecting line 6. It releases the connecting line 6 between the branching point 9 and the fluid outlet 8 for being flowed through with exhaust gas in the first position and closes it in the second position. In contrast, the second butterfly valve 15b is arranged in the evaporator bypass line 10. It serves to close the evaporator bypass line 10 in the first position, whereas it releases it for being flowed through with exhaust gas in the second position, with the result that said exhaust gas can be released in the surroundings U.

A seal element (not shown in the figures for the sake of clarity), in particular in the manner of a seal ring, for sealing the connecting line 6 with respect to the surroundings U of the exhaust gas system 1 can be provided in the connecting line 6 as a constituent part of the valve apparatus 11 which is shown in FIGS. 4 and 5, on which seal element the valve flap 13 or the two flap sections 13.1a, 13.1b of the first butterfly valve 15a is/are supported in the second position.

Figure 6:
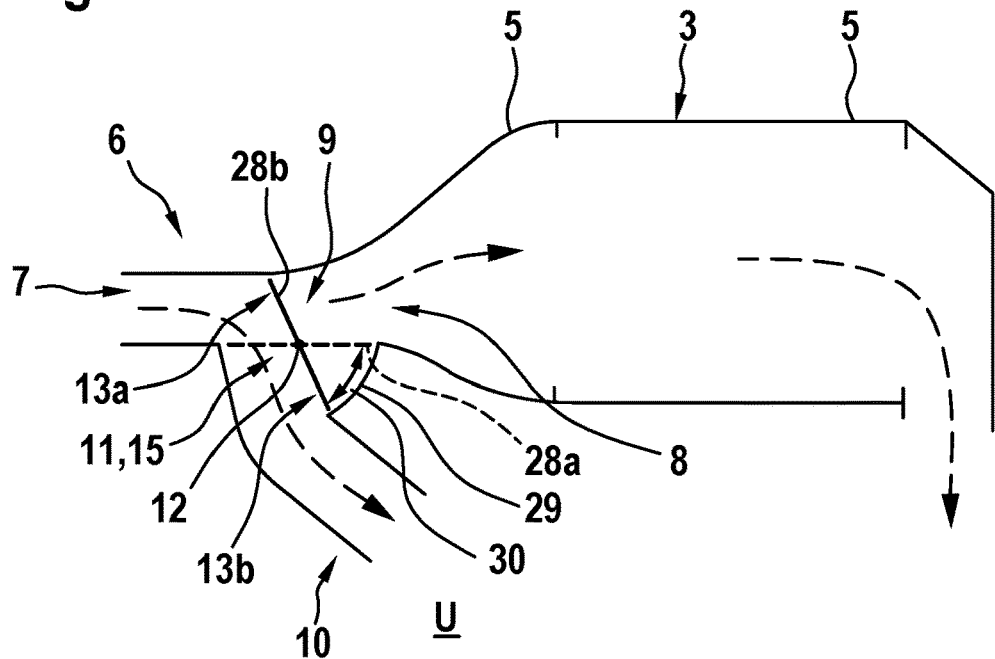
FIG. 6 shows one variant of the valve apparatus from FIG. 5 with only a single butterfly valve.

FIG. 6 shows a variant of the valve apparatus from FIG. 1 with only a single butterfly valve 15. In the exemplary scenario of FIG. 6, the connecting line 6 and the evaporator bypass line 10 can be formed integrally on the second housing 5 of the exhaust gas evaporation device 3. The provision of additional, separate components for realizing the connecting line 6 and the evaporator bypass line 10 is therefore dispensed with, which simplifies the assembly of the exhaust gas evaporation device 3. In the example of FIG. 6, the valve apparatus 11 has precisely one butterfly valve 15 which is arranged at the branching point 9 with two flap sections 13a, 13b and a valve spindle 12a which is arranged fixedly in terms of rotation between the two flap sections 13a, 13b. Here, the butterfly valve 15 can be rotationally adjusted between the first and the second position, FIG. 6 showing the butterfly valve 15 in its second position. The first position of the butterfly valve 15 is indicated using dashed lines in FIG. 6. As FIG. 6 clearly shows, the two flap sections 13a, 13b are configured in such a way that they form a line wall section 28a of the connecting line 6 in the first position. In contrast, they form a line wall section 28b of the evaporator bypass line 10 in the second position. A configuration of this type requires a particularly small amount of installation space. A common line wall section 29 of curved configuration is formed integrally between the connecting line 6 and the bypass line 10. The line wall section 29 delimits a transition region 30 between the connecting line 6 and the evaporator bypass line 10, in which transition region 30 the second flap section 13b is arranged such that it can be moved between the first and the second position for adjusting the valve apparatus 11.

Figure 2:
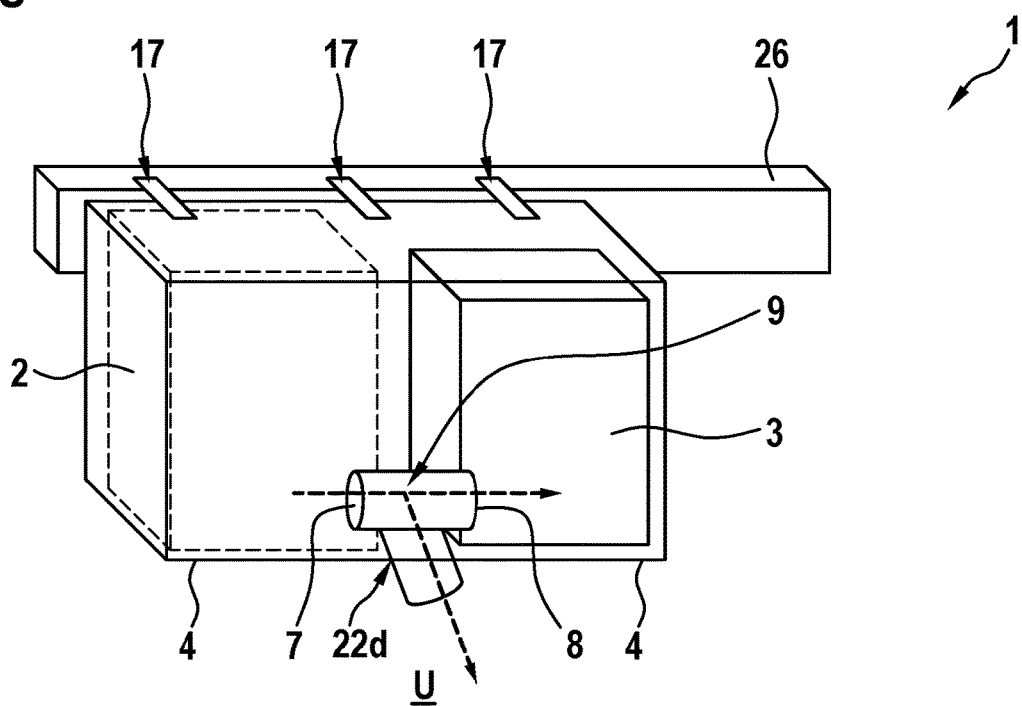
FIG. 2 shows one example of an exhaust gas system according to the invention in accordance with the second aspect in a perspective illustration.

FIG. 2 shows one example of an exhaust gas system 1 according to the invention in accordance with the second aspect. This differs from that according to FIG. 1 primarily in that the exhaust gas aftertreatment device 2 and the exhaust gas evaporation device 3 are not equipped with respectively separate housings, but rather, as shown in FIG. 2, the exhaust gas evaporation device 3 and, moreover, also the connecting line 6 are arranged in a common housing 4. The exhaust gas system 1 according to the second aspect is equipped with a valve apparatus 11 just like that of the first aspect, as has been explained using FIGS. 4 and 5. As FIG. 2 clearly shows, an aperture 22d can be provided on the housing 4 of the exhaust gas aftertreatment device 3, through which aperture 22d the evaporator bypass line 10 is guided to the outside.

Figure 3:
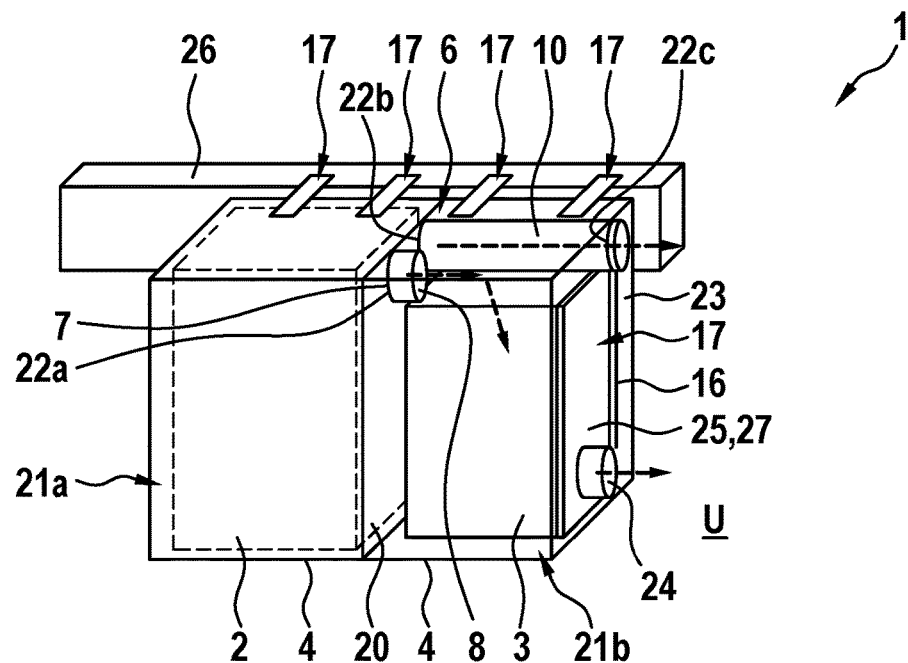
FIG. 3 shows one example of an exhaust gas system according to the invention in accordance with the third aspect in a perspective illustration.

FIG. 3 finally shows one example of an exhaust gas system 1 according to the third aspect of the invention. As can be seen from FIG. 3, the connecting line 6 does not have a fluid branch 3 between the exhaust gas aftertreatment device 2 and the exhaust gas evaporation device, as is the case in the exhaust gas system 1 according to FIGS. 1 and 2.

Instead, the evaporator bypass line 10 is configured in the exemplary scenario of FIG. 3 as a separate line which realizes a fluidic direct connection between the exhaust gas aftertreatment device 2 and the surroundings U of the exhaust gas system 1. The exhaust gas system 1 from FIG. 3 also comprises a valve apparatus (not shown in FIG. 3 for the sake of clarity) which is provided both in the connecting line 6 and in the evaporator bypass line 10 and can be adjusted between a first and a second position. In the first position of the valve apparatus, the connecting line 6 is released for being flowed through with exhaust gas, and the evaporator bypass line 10 is closed in contrast. Conversely, in the second position, the connecting line 6 is closed and the evaporator bypass line 10 is released for being flowed through with exhaust gas. If the butterfly valves 15a, 15b which are discussed above in conjunction with FIG. 5 are used, the first butterfly valve 15a is arranged in the connecting line 6 and the second butterfly valve 15b is arranged in the evaporator bypass line 10 which is separate from said connecting line 6.

In the exhaust gas system 1 according to FIG. 3, the exhaust gas evaporation device 3 and the connecting line 6 are arranged in a common housing 4 in the same way as in the exhaust gas system 1 according to the second aspect. At least one fastening element 17 is likewise provided on the housing 4 of the exhaust gas aftertreatment device 2, by means of which fastening element 17 said housing 4 can be fastened to the frame part 26 of the motor vehicle. As can be gathered from FIG. 3, furthermore, a dividing wall 20 is provided, moreover, in the housing 4 of the exhaust gas aftertreatment device 2, which dividing wall 20 divides the housing 4 into a first and a second housing interior space 21a, 21b. The first housing interior space 21a accommodates the exhaust gas aftertreatment device 2, and the second housing interior space 21b accommodates the exhaust gas evaporation device 3. A first aperture 22a is provided in the dividing wall 20, which first aperture 22a is reached through by the connecting line 6, with the result that the fluid inlet 7 of the connecting line 6 is arranged in the first housing interior space 21a. Accordingly, a second aperture 22b is provided in the dividing wall 20 for the bypass connecting line 10 which reaches through said second aperture 22b. Finally, a third aperture 22c is realized on a housing wall 23 of the second housing interior space 21a which lies opposite the dividing wall 20, which third aperture 22c is reached through, just like said second aperture 22b, by the evaporator bypass line 10. Therefore, the evaporator bypass line 10 extends in the second housing interior space 21b in a manner which is separated fluidically from the latter between the second and the third aperture 22b, 22c.

In the following text, attention is once again to be directed to the housing wall 23. It can be seen that a through opening 16 is provided in said housing wall 23, through which through opening 16 the entire exhaust gas evaporation device 3 including a fastening flange 27 which is configured as a fastening plate 25 can be inserted into the second housing interior space 21b of the housing 4, the fastening plate 25 closing said through opening 16 in a state of this type, in which it is introduced into the housing 4. The fastening flange 27 supports the entire exhaust gas evaporation device 3 and is itself fixed on the housing wall 20. FIG. 3 illustrates, furthermore, that an exhaust gas outlet 24 of the exhaust gas evaporator device 3 is also arranged in the fastening plate 25.

The invention claimed is:
1. An exhaust gas system for a motor vehicle, comprising:
an exhaust gas aftertreatment device arranged in a first housing to a portion of the motor vehicle;
an exhaust gas evaporation device fluidically communicating with the exhaust gas aftertreatment device and arranged in a second housing;
at least one fastening element provided on the first housing and the second housing, the at least one fastening element configured to secure the first housing and the second housing to the portion of the motor vehicle;
at least one other fastening element arranged to secure the first housing and the second housing to one another;
a connecting line connecting the exhaust gas aftertreatment device fluidically to the exhaust gas evaporation device, the connecting line including a fluid inlet communicating fluidically with the exhaust gas aftertreatment device and a fluid outlet communicating fluidically with the exhaust gas evaporation device, the connecting line being arranged at least partially between the first housing and the second housing;
an evaporator bypass line communicating fluidically with a surrounding environment and branching off from the connecting line at a branching point; and
a valve apparatus arranged in the connecting line and adjustable between a first position and a second position, wherein the fluid inlet communicates fluidically with the fluid outlet in the first position and the fluid inlet communicates fluidically with the evaporator bypass line in the second position.

2. The exhaust gas system as claimed in claim 1, wherein the branching point is arranged between the first housing of the exhaust gas aftertreatment device and the second housing of the exhaust gas evaporation device.

3. The exhaust gas system as claimed in claim 1, wherein the connecting line and the evaporator bypass line are disposed integrally on the second housing of the exhaust gas evaporation device.

4. The exhaust gas system as claimed in claim 1, wherein the valve apparatus includes a butterfly valve arranged at the branching point, the butterfly valve including at least two flap sections and a valve spindle arranged rotationally fixed between the at least two flap sections such that the butterfly valve is rotationally adjustable between the first position and the second position.

5. The exhaust gas system as claimed in claim 4, wherein the at least two flap sections are configured to define a line wall section of the connecting line in the first position of the valve apparatus and define a line wall section of the evaporator bypass line in the second position of the valve apparatus.

6. The exhaust gas system as claimed in claim 4, further comprising a common line wall section having a curved configuration disposed integrally between the connecting line and the evaporator bypass line, wherein the common line wall section delimits a transition region between the connecting line and the evaporator bypass line, and wherein at least one flap section of the at least two flap sections is adjustable in the transition region between the first position and the second position to adjust the valve apparatus.

7. The exhaust gas system as claimed in claim 1, wherein the valve apparatus includes a valve spindle mounted adjustably on the connecting line and a valve flap attached on the valve spindle, wherein the valve flap closes the evaporator bypass line and releases the fluid outlet when the valve apparatus is in the first position, and the valve flap releases the evaporator bypass line and closes the fluid outlet when the valve apparatus is in the second position.

8. The exhaust gas system as claimed in claim 7, wherein the valve apparatus further includes a prestressing device, the presstressing device configured to prestress the valve flap into the second position.

9. The exhaust gas system as claimed in claim 1, wherein:
the valve apparatus includes a first butterfly valve including at least two flap sections and a valve spindle arranged rotationally fixedly between the at least two flap sections, the first butterfly valve arranged between the branching point of the evaporator bypass line and the fluid outlet in the connecting line, wherein the first butterfly valve releases the connecting line for communicating a flow through of exhaust gas when the valve apparatus is in the first position and closes the connecting line when the valve apparatus is in the second position; and
the valve apparatus further includes a second butterfly valve including at least two flap sections and a valve spindle arranged rotationally fixedly between the at least two flap sections of the second butterfly valve, the second butterfly valve arranged in the evaporator bypass line, wherein the second butterfly valve closes the evaporator bypass line when the valve apparatus is in the first position and releases the evaporator bypass line for communicating a flow through of exhaust gas when the valve apparatus is in the second position.

10. The exhaust gas system as claimed in claim 1, wherein the connecting line and the bypass line are formed integrally on the second housing of the exhaust gas evaporation device.

11. An exhaust gas system for a motor vehicle, comprising: an exhaust gas aftertreatment device;
an exhaust gas evaporation device communicating fluidically with the exhaust gas aftertreatment device, the exhaust gas aftertreatment device and the exhaust gas evaporation device being arranged in a common housing;
at least one fastening element provided on the common housing for securing the common housing to a portion of the motor vehicle;
a connecting line fluidically connecting the exhaust gas aftertreatment device to the exhaust gas evaporation device, the connecting line including a fluid inlet communicating fluidically with the exhaust gas aftertreatment device and a fluid outlet communicating fluidically with the exhaust gas evaporation device;
an evaporator bypass line, wherein the exhaust gas aftertreatment device communicates fluidically via the evaporator bypass line with a surrounding environment;
the connecting line and the evaporator bypass line including a valve apparatus arranged adjustable between a first position and a second position, wherein in the first position of the valve apparatus the connecting line is released for communicating a flow through of exhaust gas and the evaporator bypass line is closed, and in the second position the second position of the valve apparatus the connecting line is closed and the evaporator bypass line is released for communicating a flow through of the exhaust gas;
a butterfly valve in at least one of the connecting line and the evaporator bypass line;
a dividing wall disposed in the common housing, the dividing wall separating the common housing into a first housing interior space and a second housing interior space;
the exhaust gas aftertreatment device is arranged in the first housing interior space and the exhaust gas evaporation device is arranged in the second housing interior space;
a first aperture receiving the connecting line arranged in the dividing wall; and a second aperture receiving the bypass connecting line arranged in the dividing wall; and
a third aperture receiving the evaporator bypass line arranged on a housing wall of the second housing interior space, the housing wall disposed opposite of the dividing wall;
wherein the evaporator bypass line extends through the second housing interior space and is separated fluidically from the second housing interior space.

12. The exhaust gas system as claimed in claim 11, further comprising:
a through opening disposed on the housing wall, wherein the exhaust gas evaporation device is insertable through the through opening into the housing; and
wherein the exhaust gas evaporation device includes a fastening flange configured to be fixed on the housing wall and close the through opening when the exhaust gas evaporation device is inserted into the housing.

13. The exhaust gas system as claimed in claim 11, wherein:
the valve apparatus includes a first butterfly valve including at least two flap sections and a valve spindle arranged rotationally fixedly between the at least two flap sections of the first butterfly valve, the first butterfly valve arranged in the connecting line, wherein the first butterfly valve releases the connecting line for communicating a flow through of exhaust gas when the valve apparatus is in the first position and closes the connecting line when the valve apparatus is in the second position; and the valve apparatus further includes a second butterfly valve including at least two flap sections and a valve spindle arranged rotationally fixedly between the at least two flap sections of the second butterfly valve, the second butterfly valve arranged in the evaporator bypass line, wherein the second butterfly valve closes the evaporator bypass line) when the valve apparatus is in the first position and releases the evaporator bypass line for communicating a flow through of exhaust gas when the valve apparatus is in the second position.

14. The exhaust gas system as claimed in claim 11, further comprising an actuator configured to adjust the valve apparatus between the first position and the second position, wherein the actuator is driven at least one of electrically, hydraulically and pneumatically.

\* \* \* \* \*